United States Patent [19]

Ueda

[11] Patent Number: 4,672,497

[45] Date of Patent: Jun. 9, 1987

[54] MAGNETIC TAPE CASSETTE
[75] Inventor: Masaki Ueda, Odawara, Japan
[73] Assignee: Fuji Photo Film Co., Ltd., Japan
[21] Appl. No.: 815,871
[22] Filed: Jan. 3, 1986
[30] Foreign Application Priority Data
  Jan. 9, 1985 [JP]  Japan ............................... 60-1235[U]
[51] Int. Cl.$^4$ ............................................. G11B 23/08
[52] U.S. Cl. ..................................... 360/132; 242/198
[58] Field of Search ......................... 360/132; 242/198
[56] References Cited
  U.S. PATENT DOCUMENTS
  4,608,616  8/1986  Wakui et al. ......................... 360/132

Primary Examiner—Robert S. Tupper
Attorney, Agent, or Firm—Pasquale A. Razzano

[57] ABSTRACT

A magnetic tape cassette comprises a cassette body for housing a magnetic tape wound around hubs and provided with tape pull-out holes at ends of a front face, and a guard panel supported on the cassette body for movement between a closed position at which the guard panel covers the magnetic tape and an opened position at which the guard panel exposes the magnetic tape at the front face of the cassette body. The guard panel comprises an outer cover for covering the outer surface of the magnetic tape at the front face of the cassette body and an inner cover supported on the outer cover for covering the inner surface of the magnetic tape. The cassette body is provided with guide walls near inner sides of the tape pull-out holes for guiding the magnetic tape, which is pulled out from the hubs, to the front face of the cassette. The outer cover is provided with vertical ribs which are inserted into the tape pull-out holes and positioned close to the guide walls to form narrow tape passages when the guard panel is closed.

6 Claims, 3 Drawing Figures

MAGNETIC TAPE CASSETTE

BACKGROUND OF THE INVENTION

1. Field of the Invention

This invention relates to a magnetic tape cassette provided with a guard panel. This invention particularly relates to an improvement in the inner wall configuration of the outer cover of a magnetic tape cassette provided with a guard panel of a dual configuration.

2. Description of the Prior Art

In general, magnetic video tape cassettes are loaded in a recording and/or reproducing apparatus and used for recording and/or reproducing information. When recording and/or reproducing is finished, a hub around which the magnetic tape is wound is locked to prevent the magnetic tape from slackening.

However, when recording and/or reproducing is finished, the magnetic tape is often wound around the hub in a loose condition, and slacks when it is subjected to external vibration.

Particularly, in a magnetic tape cassette for a small video tape recorder, such as an 8 mm video tape recorder, which is provided with the guard panel of a dual configuration comprising the inner cover and outer cover, when the magnetic tape is subjected to vibration at the time of closing the guard panel for storing the cassette, the magnetic tape jams between the outer cover and the inner cover of the guard panel and is damaged. Further, it is not always possible to correctly set the magnetic tape at the magnetic head for recording and/or reproducing.

SUMMARY OF THE INVENTION

The primary object of the present invention is to provide a magnetic tape cassette wherein the magnetic tape does not jam between the outer cover and the inner cover of the guard panel even though the cassette is subjected to vibration at the time of cassette storing.

Another object of the present invention is to provide a magnetic tape cassette wherein the magnetic tape is correctly set at the magnetic head for recording and/or reproducing.

The present invention provides a magnetic tape cassette including a cassette body for housing a magnetic tape wound around a pair of hubs and provided with tape pull-out holes at opposite ends of a front face, and a guard panel supported on the cassette body for movement between a closed position at which the guard panel covers, at the front face of the cassette body, the magnetic tape pulled out from the tape pull-out holes to the front face of the cassette body, and an opened position at which the guard panel exposes the magnetic tape at the front face of the cassette body, the guard panel comprising an outer cover for covering the outer surface of the magnetic tape pulled out to the front face of the cassette body and an inner cover supported on the outer cover for movement in synchronization with opening and closing of the outer cover to cover the inner surface of the magnetic tape when the outer cover is closed, the cassette body being provided with guide walls near inner sides of the tape pull-out holes for guiding the magnetic tape, which is pulled out from the hubs, to the front face of the cassette, wherein said outer cover is provided with vertical ribs which are inserted into said tape pull-out holes and positioned close to said guide walls when said guard panel is closed.

When the guard panel is closed, the vertical ribs of the outer cover of the guard panel are positioned close to the guide walls of the cassette body, i.e. at a distance slightly larger than the magnetic tape thickness from the guide walls. When the cassette assembling error is large, the distance should be selected considering the assembling error.

In the magnetic tape cassette of the present invention, since the outer cover is provided with the vertical ribs on the inner side and narrow passages for restricting magnetic tape slackening are formed between the vertical ribs and the tape guide walls when the guard panel is closed, tape slackening does not extend up to the front face of the cassette body even though the magnetic tape wound loosely around the hubs is pulled out from the hubs due to vibration.

Specifically, when the magnetic tape comes to the narrow passages in zig-zag form, the narrow passages act as a resistance against the magnetic tape and prevent the zig-zag form of the magnetic tape from shifting up to the front face of the cassette body.

In this manner, it is possible to prevent the magnetic tape from jamming between the outer cover and the inner cover of the guard panel and to avoid magnetic tape damage caused by jamming. Further, it is possible to smoothly set the magnetic tape with respect to the magnetic head for recording and/or reproducing.

DESCRIPTION OF THE PREFERRED EMBODIMENTS

The present invention will hereinbelow be described in further detail with reference to the accompanying drawings.

Figure 1:
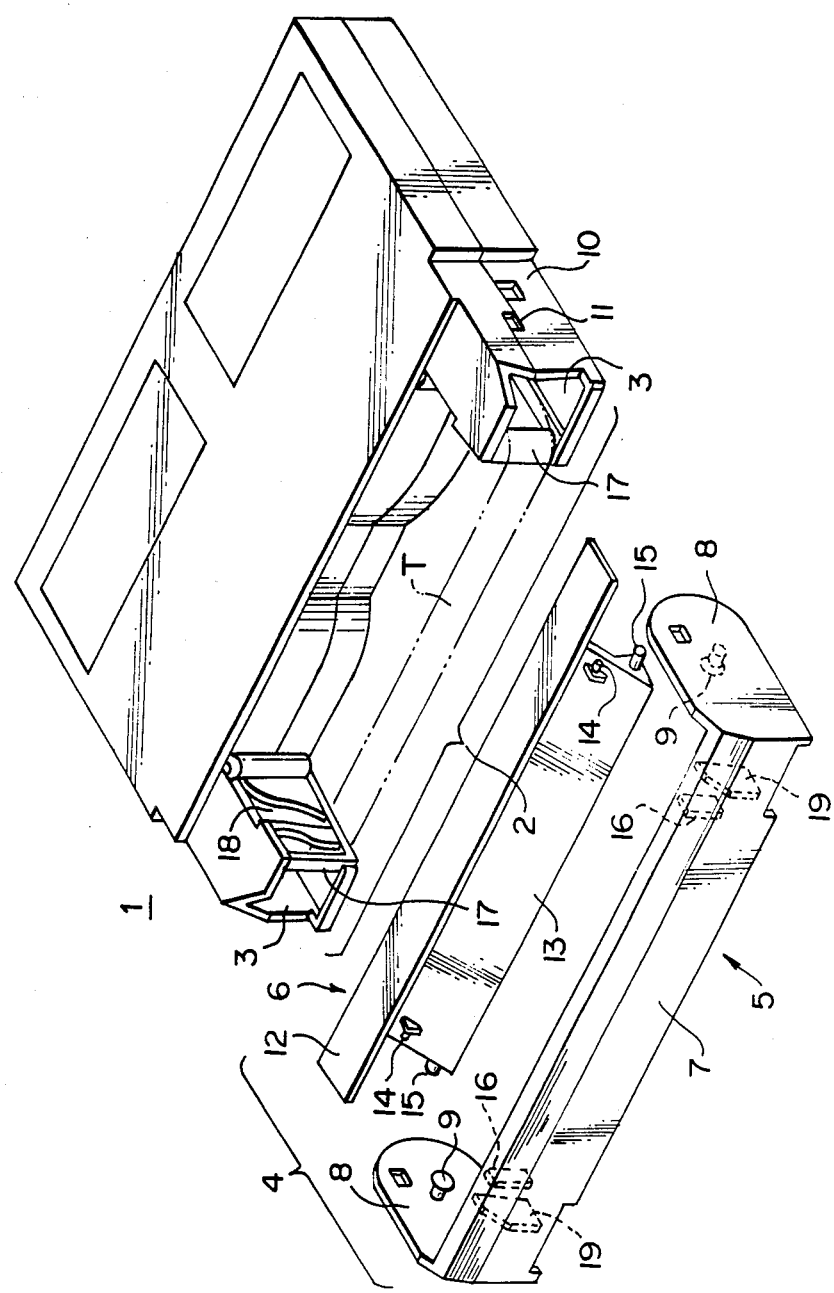
FIG. 1 is an exploded perspective view showing an embodiment of the magnetic tape cassette in accordance with the present invention.
Figure 2:
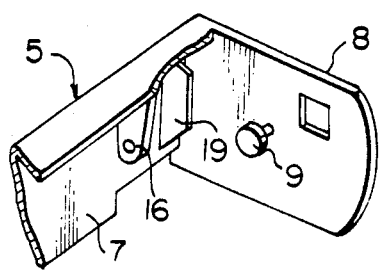
FIG. 2 is a schematic view showing the inside of a part of the outer cover of the guard panel shown in FIG. 1.

In FIG. 1, a magnetic tape T wound around hubs (not shown) and housed in a cassette 1 is exposed between tape pull-out holes 3, 3 positioned at opposite ends of a front aperture section 2 of the cassette 1. A guard panel 4 for covering the aperture section 2 is of a dual configuration comprising an approximately U-shaped outer cover 5 for covering the outer surface of the magnetic tape T and an inner cover 6 for covering the inner surface of the magnetic tape T and having an approximately T-shaped cross-section. The guard panel 4 is rotatably mounted on side faces of the cassette 1 and is normally urged in the closing direction by spring members (not shown).

The outer cover 5 is constituted by a front wall 7 positioned to cover a magnetic surface (outer surface) of the magnetic tape T, and a pair of side walls 8, 8 extending rearwardly of and normal to the opposite ends of the front wall 7.

Supporting shafts 9, 9 are projected from inner surfaces of the side walls 8, 8 and are fitted to circular holes 11, 11 (only one thereof is shown) of outer side walls 10, 10 (only one thereof is shown) of the cassette 1 in the vicinity of the tape pull-out holes 3, 3 to swingably support the outer cover 5.

Each of the circular holes 11, 11 is formed by cutting the side walls of the upper half 1a and the lower half 1b respectively to a semicircular shape around the parting plane between the upper half 1a and lower half 1b.

The inner cover 6 is constituted by an upper wall 12 for covering the upper side of the aperture section 2, and a leg wall 13 inclined towards the front wall 7 of the outer cover 5 to cover the base surface (inner surface) of the magnetic tape T. The leg wall 13 is formed integrally with the rear side of the upper wall 12 so as to have an approximately T-shaped cross-section. The leg wall 13 is provided with short shafts 14, 14 at approximately middle height portions near the opposite ends of the surface facing the front wall 7, and with guide bosses 15, 15 at lower end portions of side faces adjacent the surface provided with the short shafts 14, 14.

The short shafts 14, 14 are supported by a pair of ribs 16, 16 projecting from the inner surface of the front wall 7 of the outer cover 5. Also, the guide bosses 15 projecting from side faces of the inner cover 6 are slidably engaged with open/close guide grooves 18 of inner guide walls 17, 17 which form the tape pull-out holes 3.

Thin plate-like vertical ribs 19, 19 are projected from the inner surface of the front wall 7 of the outer cover 5 between the ribs 16, 16 and the side walls 8, 8. When the guard panel is closed, the vertical ribs 19, 19 are positioned close to the guide walls 17, 17 to form narrow passages for passing the magnetic tape together with the guide walls 17, 17.

Figure 3:
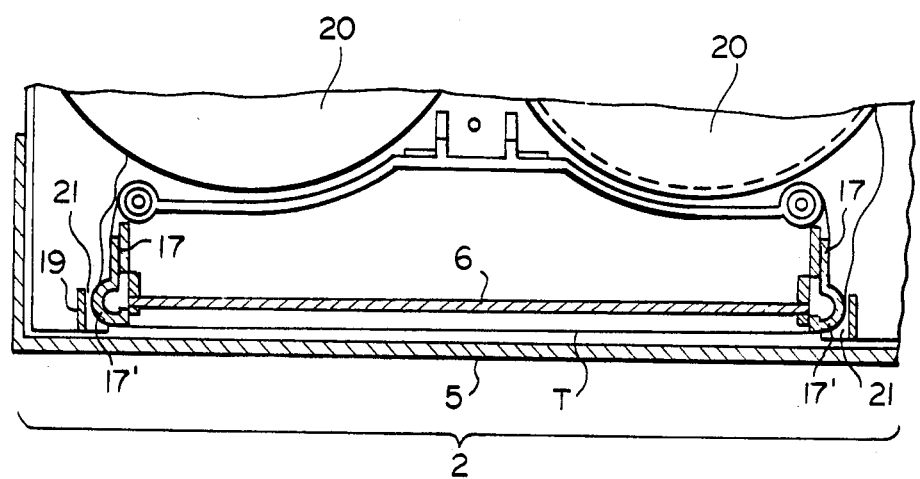
FIG. 3 is a sectional view showing the condition of the magnetic tape cassette of FIG. 1 at the time of cassette storing.

Actions of the aforesaid embodiment when the guard panel is closed will hereinbelow be described with reference to FIG. 3.

When the guard panel is closed for cassette storing, hubs 20, 20 are locked, and magnetic tape T pulled out from the hubs 20, 20 and extending between the tape pull-out holes 3, 3 is covered by the outer cover 5 and the inner cover 6 at the aperture section 2. In this condition, since the magnetic tape T is in a loosely wound condition on the hubs 20, 20, it is slowly pulled out from the hubs 20, 20 by any externally applied vibration and slackens as shown at the left of FIG. 3.

However, in this embodiment, since the vertical ribs 19, 19 projecting from the inner surface of the front wall 7 of the outer cover 5 form narrow passages 21, 21 together with circular arc-like surfaces 17', 17' of the guide walls 17, 17 when the guard panel is closed, the narrow passages 21, 21 exert a resistance against the magnetic tape and prevent the slack in the magnetic tape from extending up to the aperture section 2. The distances between the vertical ribs 19, 19 and the circular arc-like surfaces 17', 17' of the guide walls 17, 17 defining the narrow passages 21, 21 should preferably be slightly larger than the thickness of the magnetic tape, for example, within the range of 0.5 mm to 2 mm.

The vertical ribs 19, 19 may have a height of about 8 mm, a width of about 4 mm and a thickness of about 0.5 mm. However, the size and the shape of the vertical ribs 19, 19 may be modified in various manners insofar as they do not interfere with opening/closing of the guard panel and can prevent tape slackening from extending to the aperture section 2.

What is claimed is:

1. A magnetic tape cassette including a cassette body for housing a magnetic tape wound around a pair of hubs and provided with tape pull-out holes at opposite ends of a front face, and a guard panel supported on the cassette body for movement between a closed position at which the guard panel covers, at the front face of the cassette body, the magnetic tape pulled out from the tape pull-out holes to the front face of the cassette body, and an opened position at which the guard panel exposes the magnetic tape at the front face of the cassette body, the guard panel comprising an outer cover for covering the outer surface of the magnetic tape pulled out to the front face of the cassette body and an inner cover supported on the outer cover for movement in synchronization with opening and closing of the outer cover to cover the inner surface of the magnetic tape when the outer cover is closed, the cassette body being provided with guide walls near inner sides of the tape pull-out holes for guiding the magnetic tape, which is pulled out from the hubs, to the front face of the cassette,
wherein said outer cover is provided with vertical ribs which are inserted into said tape pull-out holes and positioned close to said guide walls when said guard panel is closed.

2. A magnetic tape cassette as defined in claim 1 wherein said outer cover of said guard panel is approximately U-shaped and constituted by a front wall for covering the outer surface of said magnetic tape, and a pair of side walls extending normal to said front wall and rearwardly of ends of said front wall.

3. A magnetic tape cassette as defined in claim 2 wherein said vertical ribs are projected from the inner surface of said front wall of said outer cover at positions inside of said side walls of said outer cover.

4. A magnetic tape cassette as defined in claim 1 wherein the distances between said vertical ribs and said guide walls of said cassette body when said guard panel is closed are within the range of 0.5 mm to 2 mm.

5. A magnetic tape cassette as defined in claim 1 wherein said inner cover is approximately T-shaped and constituted by an upper wall for covering an upper side of said aperture section, and a leg wall for covering the inner surface of said magnetic tape.

6. A magnetic tape cassette as defined in claim 5 wherein said guide boss is projected from each of two side wall surfaces of said leg wall.

* * * * *